United States Patent Office 2,932,623
Patented Apr. 12, 1960

2,932,623

THIXOTROPIC COATING VEHICLE CONTAINING A SHORT OIL ALKYD RESIN AND A COPOLYMER POLYAMIDE RESIN

David Glaser, St. Paul, and Harold Wittcoff, Minneapolis, Minn., assignors to General Mills, Inc., a corporation of Delaware No Drawing. Application April 2, 1956
Serial No. 575,324

4 Claims. (Cl. 260—22)

This invention relates to new and useful thixotropic vehicles and thixotropic paints. More specifically, this invention relates to the preparation of thixotropic paints containing "short oil alkyd resins."

Thixotropic paints have long been a goal of the protective coating industry. Recently it was discovered that thixotropic vehicles could be prepared from certain polyamide resins and various ester bodies as shown in Winkler U.S. Patent Number 2,663,649, patented December 22, 1953. The vehicles taught by Winkler are used with mineral spirits only and are inapplicable for use with "short oil alkyd resins" which employ aromatic solvents.

An object of this invention is to disclose thixotropic vehicles prepared from a specific type of polyamide mixture which may be utilized with short oil alkyds. Another object of this invention is to teach thixotropic vehicles which may be employed with aromatic solvents.

A thixotrope is a gel whose viscosity is affected by mechanical action i.e., the gels become liquid upon stirring and resolidify upon standing. This phenomenon is especially advantageous in the field of protective coatings. For instance, thixotropic paints are more easily applied than ordinary paints in many applications and assure the user of a uniform and consistent product as well as a uniform and consistent coating. Other advantages to this type of paint are the elimination of settling and flooding of the pigment and good package stability. The specific thixotropic vehicles and paints of this invention have the advantage of being effective in the presence of aromatic solvents.

Other objects and advantages to this invention will become apparent upon reading the specification.

It has now been discovered that a thixotropic vehicle may be prepared by employing a polyamide derived from polymeric fat acids, dibasic acids containing less than 14 carbon atoms, and an alkylene polyamine in admixture with a short oil alkyd derived from fatty acids, anhydrides of dicarboxylic aromatic acids and polyhydric alcohols.

Polyamides which may be employed in this invention are prepared by reacting polymeric fat acids, aliphatic dibasic carboxylic acids and polyamines at elevated temperatures. Generally speaking, these polyamides will have an amine number less than 10, a softening point in the range of 130° C. to 200° C. (ASTM E28–51T) and a specific gravity of approximately 1. The amine number is an expression of the number of milligrams of potassium hydroxide equivalent to the free amine groups in a one gram sample of the resin.

The polymeric fat acids employed in preparing the polyamide resins are those resulting from the polymerization of drying or semi-drying oils, or their free acids or the simple aliphatic alcohol ester of these acids. Suitable drying or semi-drying oils include soybean, linseed, tung, perilla, cottonseed, corn, sunflower, safflower, and dehydrated castor. Suitable fatty acids may also be obtained from tall oil, soapstock, and other similar materials. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. Thus, the term "polymeric fat acids" as used herein is intended to include the polymerized mixture of acids, which usually contain a predominant portion of dimer acids, a small quantity of trimer and higher polymeric fat acids and some residual monomer.

Suitable dibasic acids to be incorporated with the above polymeric fat acids in the preparation of the polyamides encompassed in this invention are illustrated by the following structural formula, HOOC(R)COOH, where R is an arylene or alkylene hydrocarbon group containing from 2 to 12 carbon atoms and preferably 4 to 8 carbon atoms. Illustrative acids of this type are sebacic, adipic, terephthalic and isophthalic and their esters.

A polyamine suitable for reaction with the above acids is represented by the general structural formula, $H_2N(R'NH)_nH$, where R' is an alkylene radical and $n$ is an integer less than 6. However, it is preferable for the purposes of this invention that $n$ be 1. Illustrative polyamines are ethylene diamine, diethylene triamine, triethylene tetramine, tetraethylene pentamine, di-1,3-propane triamine, tri-1,3-propane tetramine, di-1,2-propane triamine and the like. For the purposes of this invention it is preferable that ethylene diamine be used since amine numbers less than 10 are most easily obtained by the use of this compound.

The short oil alkyds to be combined with the above polyamides are composed of fatty acids, polyhydric alcohols and aromatic anhydrides. It is also possible to modify these alkyds in various ways such as by the addition of rosins or its derivatives and other resins.

As used in this invention fatty acids refer to both saturated and unsaturated monocarboxylic acids containing 8 to 22 carbon atoms. Illlustrative acids are oleic, linoleic, linolenic, stearic, myristic, lauric and other similar acids. These acids may be obtained from fats and oils which occur in nature as triglycerides. Suitable oils are exemplified by the following oils—soybean oil, cotton seed oil, tung oil, coconut oil, tallow etc. It will also be recognized that these oils or triglycerides may be incorporated directly into the reaction mixture since they contain glycerol, which is one of the common polyhydric alcohols used in this type of composition.

Other polyhydric alcohols useful in this invention are illustrated by the following compounds; 1,2-ethanediol, 1,2-propanediol, 1,3-butanediol, 2,3-butanediol, 1,2-pentanediol, 1,4-pentanediol, 2,4-pentanediol, 3,4-hexanediol, pentaerythritol, mannitol, sorbitol, iditol, dulcitol, 1,2,3-butanetriol, 2-butene-1,4-diol, 1,2,5-pentanetriol, 2,3,4-pentanetriol, 2,3,4-trimethyl-2,3,4-pentanetriol, 1,2,6-hexanetriol, 3,4,5-trimethyl-3,4,5-heptanetriol, 1,2,3-trimethylol propane, 3-chloro-1,2-propanediol, 1,3-cyclohexanediol, 1,4-cyclohexanediol, 3-chloro-2-methyl-1,2-propanediol, 5-bromo-1,2,6-hexanetriol, and any polymethylene glycol in the series from trimethylene glycol to decylene glycol. Preferable polyhydric alcohols are those containing at least 3 carbon atoms and less than 6 carbon atoms.

Most common of the aromatic anhydrides which are useful in the preparation of short oil alkyds is phthalic anhydride. This is due primarily to its favorable cost advantage and it will be recognized that other similar acids are within the teachings of this invention.

It will also be recognized that the above constituents may be varied within reasonable ranges. However, in the preparation of the polyamides it is necessary that they contain at least 3% and not more than 30% by weight of the saturated aliphatic dibasic acids. It will also be recognized that in the preparation of the polyamides approximately stoichiometric proportions of the polymeric fat acids and dicarboxylic acids must be employed in relation to the polyamine in order to obtain polyamides having sufficiently low amine numbers and acid numbers.

"Short oil alkyd resins" as used in this specification refers to those alkyds composed of fatty acids, anhydrides of dicarboxylic aromatic acids and polyhydric alcohols which are relatively insoluble in mineral spirits but are soluble in aromatic solvents. Illustrative aromatic solvents are toluene, benzene, xylene and other related solvents. In contrast, "long oil alkyd resins" are soluble in both mineral spirits and aromatic solvents. "Short oil alkyd resins" are generally prepared by reacting a mixture of naturally occurring oils, or fatty acids derived from them, phthalic anhydride, and an excess of a polyhydric alcohol such as glycerol or pentaerythritol, in the presence of a suitable catalyst, in which the naturally occurring oil, or the fatty acid, constitutes 20 to 45% by weight of the mixture.

This invention may be illustrated further by reference to the following examples in which all "parts" are expressed as parts by weight.

*Example I*

A polyamide was prepared by reacting 100 parts polymeric fat acids, 10 parts sebacic acid, and 13 parts ethylene diamine to produce an amber colored, hard, tough resin. This polyamide had an amine number less than 3, a softening point (ASTM E28–51T) of about 185° C. and a viscosity of 3–4 poises at 200° C. as measured on a Brookfield viscometer. It was also insoluble in xylene and mineral spirits.

100 parts of a "short oil alkyd resin," having a viscosity of J–N on the Gardner-Holdt scale and an acid number less than 15, prepared from about 40 parts soybean oil, 43.5 parts phthalic anhydride and 22.8 parts 95% glycerine, was mixed with 5 parts of the polyamide prepared as shown above. This mixture was heated for 30 minutes at 450° F. at which time they had become compatible. A 50% non-volatile solution of the resulting product in xylene was thixotropic.

*Example II*

5 parts of the polyamide prepared as shown in Example I was added to 100 parts of a rosin modified short oil alkyd Beckosol 3, sold by Reichhold Chemicals, Inc. This product is identified by the manufacturer as a solvent-free, rosin-modified short oil alkyd resin containing 33% soybean oil and 44% phthalic anhydride. This mixture was also heated for 30 minutes at 450° F. at which time the two components were compatible. A 50% non-volatile solution of the resulting product with xylene as solvent was thixotropic.

When a polyamide containing no sebacic acid was employed and treated according to the teachings of this example, no thixotropy resulted.

*Example III*

A thixotropic vehicle was prepared in the same manner as shown in Example I except that the short oil alkyd resin employed was Glyptal 2462, a product of General Electric Company. This product is identified by the manufacturer as a 50% non-volatile solution in a 75/25 blend of xylol and mineral spirits, the non-volatile portion containing 37% semi-drying oil and 40% phthalic anhydride. Its xylol content was stripped off in a vacuum and 100 parts of the residue was heated at 450° F. for 30 minutes with 5 parts of the polyamide prepared as shown in Example I. A 50% nonvolatile solution of the resulting product in xylene was thixotropic. 100 parts of this vehicle in admixture with 20 parts xylene, 30 parts titanium oxide and .03 part 6% cobalt naphthenate drier resulted in an excellent thixotropic white enamel. 1 part of this thixotropic enamel was then mixed with 3 parts of an ordinary white enamel based on the same alkyd but containing no polyamide resin. This resulting mixture was still thixotropic and had an excellent viscosity.

Thus, the thixotropic vehicles taught by this invention may have an aromatic insoluble polyamide content of from 1 to 5% by weight of the short oil alkyd resin employed. These vehicles may then be employed to make thixotropic paints which have excellent non-settling qualities and sag resistance in addition to an improved resistance to color flooding and floating.

In addition to the use of naphthenate salts as the drier, it is also possible to incorporate various linoleates and 2 ethylhexanoates. Likewise, zinc or lead salts may be employed in place of or in addition to cobalt.

Therefore, many modifications and variations of the invention as hereinbefore set forth may be made without departing from the spirit and scope thereof, and therefore only such limitations should be imposed as are indicated in the appended claims.

Now, therefore, we claim:

1. A thixotropic vehicle composed of (1) an aromatic hydrocarbon solvent, (2) a short oil alkyd resin formed by the reaction of a mixture of phthalic anhydride, a polyhydric alcohol selected from the group consisting of glycerol and pentaerythritol and from 20 to 45% by weight of the mixture of a compound selected from the group consisting of naturally occurring glyceride oils and the fatty acids thereof containing from 8 to 22 carbon atoms and (3) from 1 to 5% by weight based on said short oil alkyd resin of a polyamide which is formed by the reaction of a mixture of (a) dimerized and trimerized polymeric fat acids (b) from 3 to 30% by weight based on the total acids of aliphatic dicarboxylic acids containing less than 14 carbon atoms and (c) substantially an equivalent weight of a polyamine of the general structural formula $H_2N(R'NH)_nH$ where $R'$ is an alkylene radical and $n$ is an integer less than 6.

2. A thixotropic vehicle as defined in claim 1 in which said polyamine is ethylene diamine and said dicarboxylic acid is sebacic acid.

3. A thixotropic vehicle as defined in claim 1 in which said polyamine is ethylene diamine and said dicarboxylic acid is adipic acid.

4. A thixotropic vehicle as defined in claim 1 in which the aromatic solvent is selected from the group consisting of benzene, toluene and xylene.

References Cited in the file of this patent

UNITED STATES PATENTS

| | | |
|---|---|---|
| 2,379,413 | Bradley | July 3, 1945 |
| 2,450,940 | Cowan | Oct. 12, 1948 |
| 2,663,649 | Winkler | Dec. 22, 1953 |